(12) United States Patent
Kite (10) Patent No.: US 7,558,349 B2
(45) Date of Patent: Jul. 7, 2009

(54) METHOD AND APPARATUS FOR MEASURING CHARACTERISTICS OF A MULTI-CHANNEL SYSTEM IN THE PRESENCE OF CROSSTALK

(75) Inventor: Thomas D. Kite, Beaverton, OR (US)

(73) Assignee: Audio Precision, Inc., Beaverton, OR (US)

(*) Notice: Subject to any disclaimer, the term of this patent is extended or adjusted under 35 U.S.C. 154(b) by 629 days.

(21) Appl. No.: 11/413,650

(22) Filed: Apr. 27, 2006

(65) Prior Publication Data

US 2007/0253469 A1     Nov. 1, 2007

(51) Int. Cl.
   *H03D 1/04* (2006.01)
(52) U.S. Cl. ........................ 375/346; 375/349
(58) Field of Classification Search ........... 375/346, 375/349
   See application file for complete search history.

(56) References Cited

U.S. PATENT DOCUMENTS

| | | | |
|---|---|---|---|
| 3,895,191 A | 7/1975 | Koganezawa | |
| 4,202,048 A | 5/1980 | Edwards | |
| 4,532,603 A | 7/1985 | Gerard | |
| 4,567,583 A | 1/1986 | Landrum, Jr. | |
| 4,759,013 A | 7/1988 | Ichiyoshi | |
| 5,463,661 A * | 10/1995 | Moran et al. | 375/222 |
| 5,532,603 A | 7/1996 | Bottman | |
| 5,574,748 A | 11/1996 | Vander Mey et al. | |
| 6,091,356 A | 7/2000 | Sanders et al. | |
| 6,418,158 B1 | 7/2002 | Vishwanath et al. | |
| 2001/0038702 A1 | 11/2001 | Lavoie et al. | |
| 2002/0093880 A1 | 7/2002 | Nakamura | |
| 2003/0022650 A1 | 1/2003 | Tsuji et al. | |
| 2003/0093224 A1 | 5/2003 | Jeffryes | |

(Continued)

FOREIGN PATENT DOCUMENTS

DE         19930975 C2     1/2001

(Continued)

OTHER PUBLICATIONS

Kite, Thomas: "Measurement of audio equipment with log-swept sine chirps," Audio Engineering Society, Convention Paper presented Oct. 28-31, 2004, San Francisco, CA. Also published ****.

(Continued)

*Primary Examiner*—Kevin Y Kim
(74) *Attorney, Agent, or Firm*—William A. Birdwell (57) ABSTRACT

A method and apparatus for measuring channel characteristics of a multi-channel system. In accordance with the method and the apparatus, a first chirp is applied as an input to one channel of a multi-channel system at a first time, and a second chirp is applied as an input to another channel of the multi-channel system at a second time, the second time being separated from the first time by a predetermined first time interval. An output signal is acquired from a selected one of the channels. At least one crosstalk component is separated from non-crosstalk components in the output signal to characterize the selected channel based on non-crosstalk components. Preferably, the chirp is an exponential chirp that enables harmonic distortion components to be distinguished and measured in one channel in the presence of crosstalk from one or more other channels.

56 Claims, 7 Drawing Sheets

U.S. PATENT DOCUMENTS

| | | |
|---|---|---|
| 2005/0010092 A1 | 1/2005 | Weber et al. |
| 2005/0152487 A1 | 7/2005 | Reichard |
| 2005/0267695 A1 | 12/2005 | German |
| 2006/0002364 A1 | 1/2006 | Riley et al. |
| 2006/0012797 A1 | 1/2006 | Chang et al. |

FOREIGN PATENT DOCUMENTS

| | | |
|---|---|---|
| JP | 63039171 A | 2/1988 |
| JP | 09005310 A | 1/1997 |
| JP | 2000356571 A | 12/2000 |

OTHER PUBLICATIONS

Farina, Angelo, "Simultaneous measurement of imppulse response and distortion with a swept-sine technique," Paper from University of Industrial Engineering, Parma, Italy, 108th AES Convention, Paris, France, Feb. 18-22, 2000.

Muller, Swen, "Transfer-Function Measurement with Sweeps," J. Audio Eng. Soc., vol. 49, No. 6, Jun. 2001.

* cited by examiner

METHOD AND APPARATUS FOR MEASURING CHARACTERISTICS OF A MULTI-CHANNEL SYSTEM IN THE PRESENCE OF CROSSTALK

BACKGROUND OF THE INVENTION

1. Field of the Invention

This invention relates to measuring the channel characteristics of a multi-channel audio system, particularly to methods and apparatuses for measuring such channel characteristics essentially simultaneously in the presence of crosstalk.

2. Description of the Related Art

It is common for tests and measurements to be made on many different types of audio systems to determine whether they are functioning as desired or needed, or simply to characterize the system. Audio systems comprise a wide variety of apparatuses, including without limitation analog audio amplifiers, mixers, recording and playback devices, and telephone channels, and digital audio processors, recording and playback devices, and communication systems. Test and measurement instruments typically apply a known audio stimulus to the input of an audio system, measure the output produced in response to the stimulus, and determine the system characteristics generally by comparing the output to the input. Characteristics of a channel of an audio system that may be determined are, for example, frequency response, phase distortion, and harmonic distortion, but many other characteristics can be determined depending on the circumstances. The linear characteristics can be determined by measuring the linear impulse response of the system, from which the linear characteristics can be derived.

It is well recognized that many audio systems are provided with multiple channels. For example, stereo audio amplifiers are ubiquitous in the music reproduction field. As another example, many different kinds of telephone communications systems, from cables of twisted pairs of wires to optical fibers, provide many distinct communications channels. As yet a further example, audio mixers typically have many channels to accommodate a large number of sound sources to be mixed.

A potential problem with multi-channel audio systems is that undesired signal energy may be coupled from one channel into another. This is known as "crosstalk." Not only does crosstalk degrade the channel quality, but its presence during testing masks the signal components to be identified. Consequently, the usual approach is to test each channel separately, while the other channels are grounded so that they do not produce any crosstalk in the channel being tested. This makes testing a multi-channel audio system much slower that testing a single channel audio system. Particularly in the case of production testing, this makes the process expensive because it limits the product completion rate.

In audio system test and measurement it is known that one particularly useful type of stimulus to use is a swept frequency signal that starts at a first, low frequency and ends after a short, definite time at a second, high frequency. This stimulus is known as a "chirp." Using a chirp, the characteristics of an audio channel can be determined quickly over the full spectrum of the ideal channel pass band without being obscured by inter-modulation distortion. One type of chirp that can be used is a linear chirp, whose frequency varies linearly with time. Thus, a linear chirp may be described mathematically as follows:

$$x(t) = \sin\left[2\pi t\left(f_1 + \frac{(f_2 - f_1)t}{T}\right)\right]$$

where t is time;
x(t) is the stimulus signal as a function of time;
$f_1$ is the low, starting frequency, in Hz;
$f_2$ is the high, ending frequency, in Hz; and
T is the total length of the stimulus, in seconds.

However, a linear chirp has the drawback that, while useful measurements of some characteristics can be made, harmonic distortion components in the output cannot be distinguished from the linear characteristics, or from one another.

Another type of chirp that can be used is an exponential, or log-swept sine, chirp, whose frequency vanes exponentially with time. Thus, an exponential chirp may be described mathematically as follows:

$$x(t) = \sin\left[\frac{2\pi f_1 T}{\ln(f_2/f_1)}\left(\left(\frac{f_2}{f_1}\right)^{t/T} - 1\right)\right]$$

where t is time;
x(t) is the stimulus signal as a function of time;
T is the total length of the chirp, in seconds;
$f_1$ is the low, starting frequency, in Hz; and
$f_2$ is the high, ending frequency, in Hz.

The exponential chirp has the important advantage that harmonic distortion components can be distinguished from one another. This is explained, for example, in T. Kite, *Measurement of audio equipment with log-swept sine chirps*, J. Audio Eng. Soc., vol. 53, p. 107 (2005 January/February).

More specifically, it can be shown that:

$$t(f) = \frac{T}{\ln(f_2/f_1)} \ln\left(\frac{f}{f_1}\right)$$

where t(f) is the time at which a particular instantaneous frequency f appears in the chirp signal.

If the channel under test generates harmonic distortion such that when the input frequency is f, the harmonic distortion component in the output has a frequency Nf, where N is an integer harmonic, then the group delay of this distortion component is:

$$t(f) = \frac{T}{\ln\left(\frac{f_2}{f_1}\right)} \ln\left(\frac{f}{Nf_1}\right)$$

so that each harmonic is offset in time from t(f) by:

$$\Delta t_N = -T\left(\frac{\ln(N)}{\ln\left(\frac{f_2}{f_1}\right)}\right)$$

Consequently, the non-linear harmonic distortion characteristics, as well as the linear response characteristics, can be measured using an exponential chirp.

In either case, even the linear response characteristic measurements are made more difficult by crosstalk. So, chirp testing of a multi-channel audio system has ordinarily been done one channel at a time.

In view of the foregoing, it would be desirable to have a way of simultaneously, or essentially simultaneously, testing at least a plurality of the channels of a multiple-channel audio system while measuring all of the ordinary characteristics in the presence of crosstalk, and also measuring crosstalk.

BRIEF SUMMARY OF THE INVENTION

The present invention provides a method and apparatus for measuring channel characteristics of a multi-channel system.

In accordance with the method, a first chirp is applied as an input to a first channel of the multi-channel system at a first time, and a second chirp is applied as an input to a second channel of the multi-channel system at a second time, the second time being separated from the first time by a predetermined first time interval. A first output signal is acquired from a selected one of the first channel or the second channel. At least one crosstalk component is separated from non-crosstalk components in the first output signal to characterize the selected one channel based on non-crosstalk components.

In a preferred apparatus for measuring channel characteristics of a multi-channel system, a signal generator is provided for generating a first chirp as an input to a first channel of the multi-channel system at a first time and for generating a second chirp as an input to a second channel of the multi-channel system at a second time, the second time being separated from the first time by a predetermined first time interval. A signal acquisition device is provided for acquiring a first output signal from a selected one of the first channel or the second channel. A signal processing device is provided for separating at least one crosstalk component from non-crosstalk components in the first output signal to characterize the selected one channel based on non-crosstalk components.

Preferably, the signal generator comprises a digital processor programmed to produce digital representations of the first chirp signal and the second chirp signal, and digital-to-analog converters are provided where necessary to convert the digital representations of the first chirp signal and the second chirp signal to analog representations thereof. The signal acquisition device includes analog-to-digital converters where necessary to convert analog signal outputs from the multi-channel system under test to digital representations thereof. Preferably, the signal processing device comprises a digital signal processor programmed to separate in the first output signal at least one crosstalk component from the non-crosstalk components.

Preferably the chirp is a log-swept sine chirp that enables harmonic distortion components to be distinguished and measured in one channel in the presence of crosstalk from one or more other channels.

It is to be understood that this summary is provided as a means of generally determining what follows in the drawings and detailed description, and is not intended to limit the scope of the invention. Objects, features and advantages of the invention will be readily understood upon consideration of the following detailed description taken in conjunction with the accompanying drawings.

DETAILED DESCRIPTION OF ILLUSTRATIVE EMBODIMENTS

Overview

The invention provides for measuring the characteristics of audio channels of a multi-channel audio system in the presence of, and including, crosstalk between channels using a chirp signal. The audio system channels may have analog inputs and analog outputs, as shown by the system under test 10 in FIG. 1A; digital inputs and digital outputs, as shown by the system under test 12 in FIG. 1B; analog inputs and digital outputs, as shown by the system under test 14 in FIG. 1C; digital inputs and analog outputs, as shown by the system under test 16 in FIG. 1D; or some combination of digital inputs and outputs among the channels. Regardless of the type of input required, or output produced, by the channel, a chirp signal is applied to the inputs of a plurality of channels, in analog or digital form as required, the responses produced at the respective outputs of the channels are acquired, and the channel characteristics and crosstalk are determined based on those responses.

The output signal produced by a channel in response to a chirp signal is deconvolved to determine the impulse response of the channel. From that impulse response, channel characteristics such as frequency response, total harmonic distortion, phase distortion and the crosstalk can be computed. While the linear response characteristics could be computed from the impulse response found by a stimulus other than an exponential chirp signal, as will be understood by a person of ordinary skill in the art, an exponential chirp signal also enables individual harmonic distortion components to be identified, as has been explained above in Description of Related Art.

To be able to distinguish channel transfer characteristics from crosstalk, the chirp signals applied to various channels are offset in time from one another by a predetermined time interval. This enables the impulse response of the channel of interest to be distinguished from an artifact produced by the impulse response of another channel that is generated in the channel of interest, based on the time of occurrence of the artifact. Consequently, both the transfer characteristics of the channel of interest and the amount of crosstalk from other channels can be determined.

The Measurement Method

To illustrate the method of the invention, the following explanation assumes that a multi-channel audio system under test has three channels, that is, channel 1, channel 2 and channel 3, and that all three channels are be to tested for their transfer characteristics in the presence of crosstalk, and for the amount of crosstalk itself. However, as is well recognized, many audio systems have only two channels and many have more than three channels. The principles of the invention explained by this example apply equally to a two channel system and to systems having more than three channels.

Figure 1A:
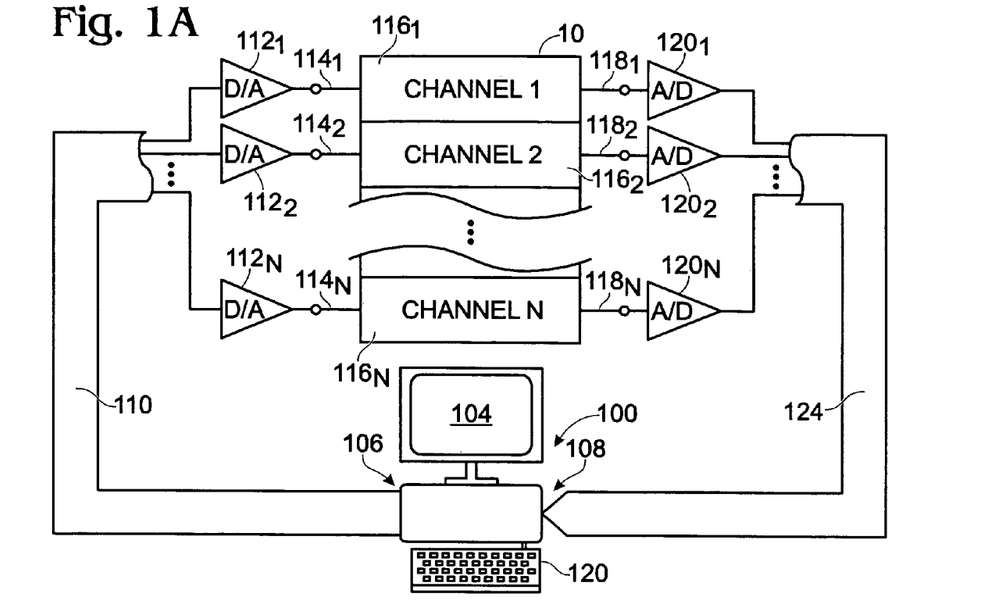
FIG. 1A is a block diagram of a measuring apparatus according to the present invention connected to a representative multi-channel system under test having analog inputs and analog outputs.

Referring to FIG. 1A, a first chirp signal is applied to the input of channel 1, a second identical chirp signal is applied to the input of channel 2, and a third identical chirp signal is applied to channel 3, where in this example N=3. The second chirp signal is delayed relative to the first chirp signal by a predetermined time interval δ. The third chirp signal is delayed relative to the first chirp signal by time interval 2δ.

Figure 2A:
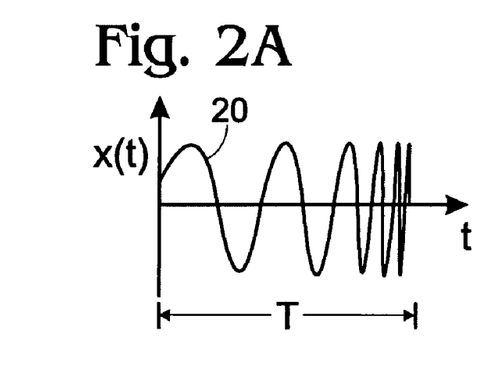
FIG. 2A is an illustrative waveform of a chirp signal that may be employed according to the present invention.
Figure 2B:
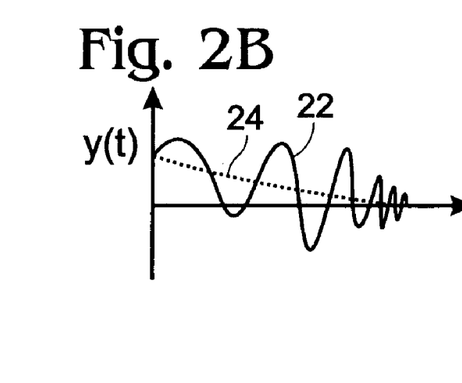
FIG. 2B is an illustrative waveform of a typical output of one channel of a multi-channel system to which the chirp signal of FIG. 2A is applied.
Figure 2C:
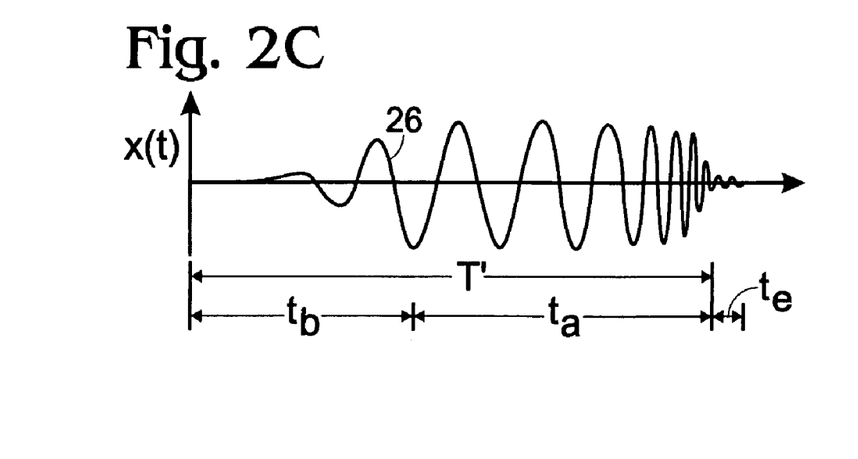
FIG. 2C is an illustrative waveform of a preferred chirp signal that may be employed according to the present invention.
Figure 2D:
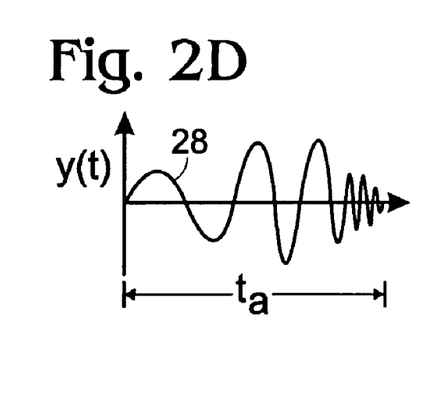
FIG. 2D is an illustrative waveform of a typical output of one channel of a multi-channel system to which the chirp signal of FIG. 2C is applied.

All of the chirp signals must have the same characteristic to use conventional deconvolution. While linear response characteristics can be determined in the presence of crosstalk using a chirp having a frequency sweep function that is other than exponential, it would be impossible to recover harmonic distortion components in the deconvolved output signal. Therefore, it is preferred that a chirp having an exponential frequency sweep function, such as those shown in FIGS. 2A and 2C, be used. FIG. 2A shows an exponential chirp signal 20 having a duration T and essentially constant amplitude. FIG. 2B shows the time-domain response 22 of a typical audio channel to the chirp 20. It also shows that, due to the rapid turn on of the chirp 20, the response 22 has a transient component 24, which is undesirable. Consequently, it is preferred that the chirp signal 26 shown in FIG. 2C be used instead. This chirp signal has a duration T', a beginning time period $t_b$ during which it is tapered on, an intermediate time period $t_{ca}$ during which the envelope amplitude of the chirp is constant, and an ending time period $t_e$ during which the chirp signal is tapered off. In addition, the chirp signal is forced to start at a zero crossing. This chirp signal reduces the unwanted transient response to an acceptable level, as shown by the waveform 28 in FIG. 2D and described in the copending patent application of Thomas Kite entitled METHOD AND APPARATUS FOR MEASURING CHARACTERISTICS OF AN AUDIO SYSTEM USING A TAPERED CHIRP filed concurrently herewith. That application is hereby incorporated in this application in its entirety.

Figure 3A:
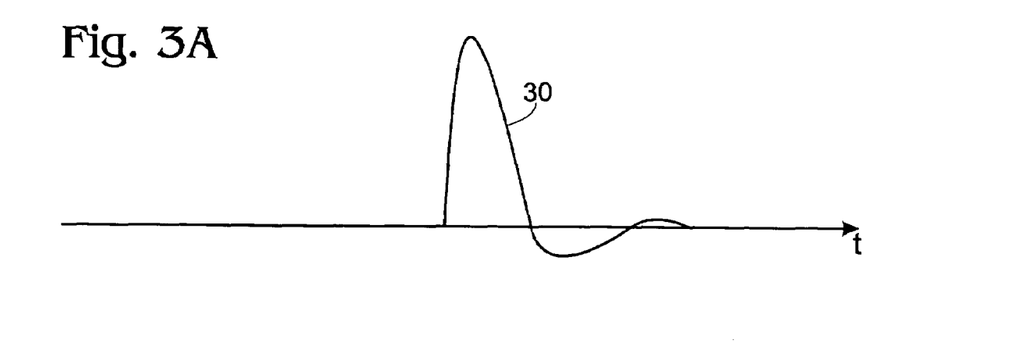
FIG. 3A is an illustrative waveform of the deconvolved output of a second channel of a multi-channel system to which the chirp signal of FIG. 2C is applied, in the absence of harmonic distortion and crosstalk.

Turning now to the transfer characteristics of channel 2, FIG. 3A shows an illustrative waveform of the deconvolved output signal of channel 2 in the absence of harmonic distortion and crosstalk from any other channel. This is a time-domain representation and is the linear impulse response 30, as will be understood by a person of ordinary skill in the art. However, one object of the invention is to measure non-linear transfer characteristics, such as harmonic distortion, in the presence of crosstalk. To that end, it will be assumed hereafter that an exponential chirp is employed.

Figure 3B:
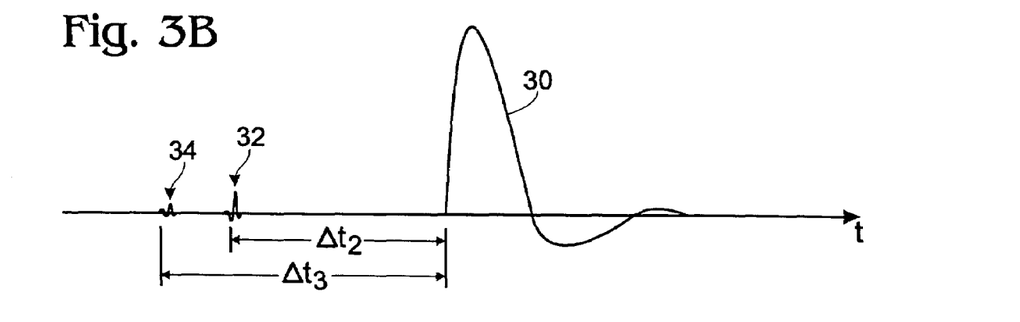
FIG. 3B is an illustrative waveform of the deconvolved output of a second channel of a multi-channel system to which the chirp signal of FIG. 2C is applied, in the presence of harmonic distortion but the absence of crosstalk.

FIG. 3B shows an illustrative waveform of the deconvolved output signal of channel 2 in the presence of harmonic distortion. More specifically, it shows the linear impulse response 30, a second harmonic component 32 that precedes the linear impulse response by time $\Delta t_2$, and a third harmonic component 34 that precedes the linear impulse response by time $\Delta t_3$, as explained in the Description of Related Art above. It should be appreciated that only the second and third harmonic distortion components are shown for the purpose of explanation, but that many other harmonics may be present. It also should be appreciated that the amplitudes of these components will vary depending on the particular system.

Figure 3C:
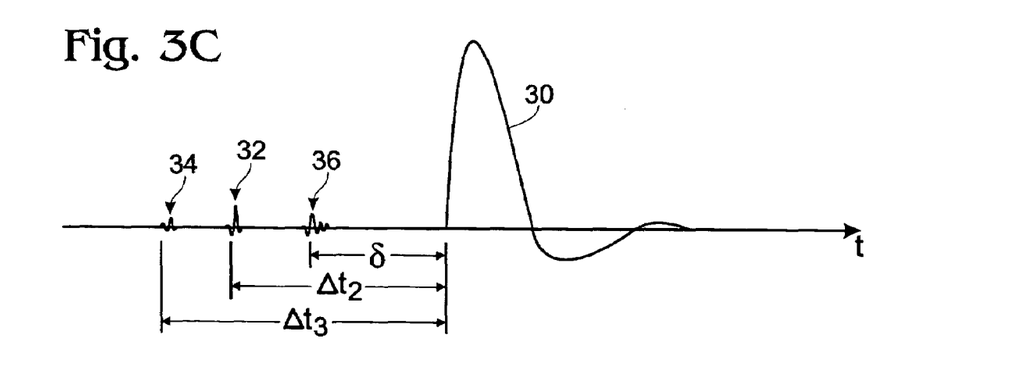
FIG. 3C is an illustrative waveform of the deconvolved output of a second channel of a multi-channel system to which the chirp signal of FIG. 2C is applied, in the presence of harmonic distortion and crosstalk from a first channel.

Assuming that crosstalk is produced in channel 2 by channel 1, that is, the channel to which the chirp signal is first applied, FIG. 3C shows an illustrative waveform of the deconvolved output signal of channel 2 in the presence not only of second and third harmonic distortion components, but also a crosstalk artifact 36 from channel 1. This artifact precedes the linear impulse response of channel 2 by δ, since that is the time by which the chirp signal applied to channel 1 precedes the chirp signal applied to channel 2. With the proper choice of δ, this fits conveniently between the first harmonic distortion component 32 and the linear impulse response 30 so that it can be readily identified.

Figure 3D:
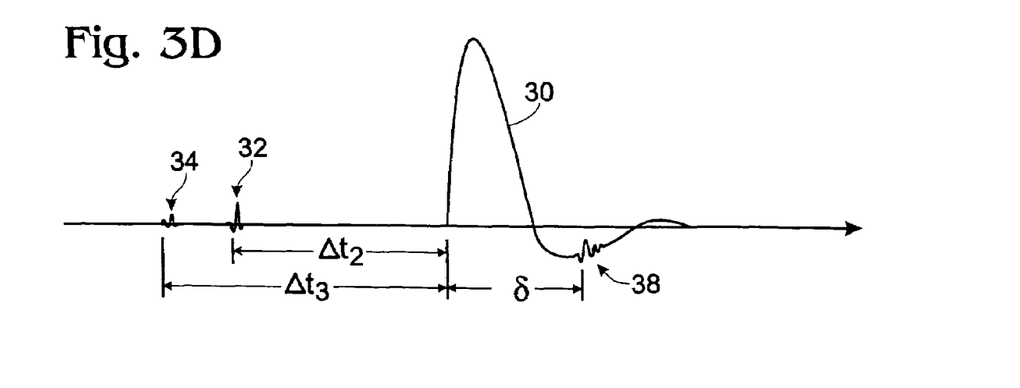
FIG. 3D is an illustrative waveform of the deconvolved output of a second channel of a multi-channel system to which the chirp signal of FIG. 2C is applied, in the presence of harmonic distortion and crosstalk from a third channel.
Figure 3E:
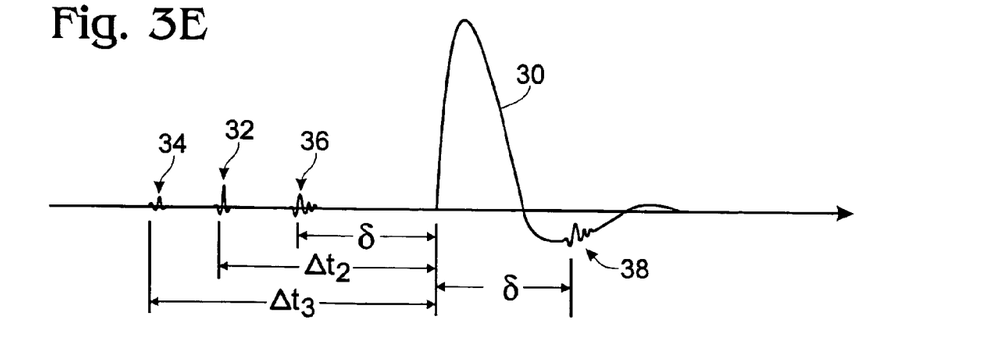
FIG. 3E is an illustrative waveform of the deconvolved output of a second channel of a multi-channel system to which the chirp signal of FIG. 2C is applied, in the presence of harmonic distortion and crosstalk from both a first channel and a third channel.

On the other hand, the chirp signal applied to channel 3 follows the chirp signal applied to channel 2, so a crosstalk artifact 38 from channel 3 follows the linear impulse response of channel 2 by δ, as shown by FIG. 3D. Consequently, in the deconvolution of the output signal from channel 2, it is superimposed on the tail of the linear impulse response. FIG. 3E illustrates the situation where there is crosstalk in channel 2 from both channel 1 and channel 3. These two situations require further processing in order to separate the crosstalk from the linear impulse response of the channel being tested.

Separation is achieved by relying on the facts that (1) the crosstalk artifacts are separated in time from the linear impulse response of the channel being measured by an integral multiple of δ, and (2) the crosstalk typically has relatively low amplitude and high frequency content. The crosstalk artifact is related to the impulse response of its source channel but typically is predominately a high-frequency weighted and attenuated version of the linear impulse response of that source channel. This is because, in most cases, only a small portion of the power from the source channel is coupled into the channel being measured, and even then the coupling mechanism ordinarily behaves like a high-pass filter. On the other hand, the linear impulse response produces a relatively high amplitude feature.

Preferably, in practice using digital signal processing techniques, a time shift is inserted in the deconvolution of the channel output signal so that the beginning of the linear impulse response occurs at the middle of the deconvolved output data samples. However, the channel typically introduces some time delay, so the actual position of the beginning of the linear impulse response is determined by locating the peak amplitude feature of the deconvolved channel signal output. The crosstalk artifacts are then found at integral multiples of δ relative to the location of the beginning of the impulse response.

Separation can occur in the time domain or the frequency domain. An important part of separation is imposing a lower frequency limit $f_c$ on the recovered crosstalk. In the time domain, this establishes a maximum extent of the crosstalk response. If crosstalk having frequency components below $f_c$ of sufficient magnitude is actually present, it will not be recovered correctly, and it may corrupt the underlying response.

Figure 3F:
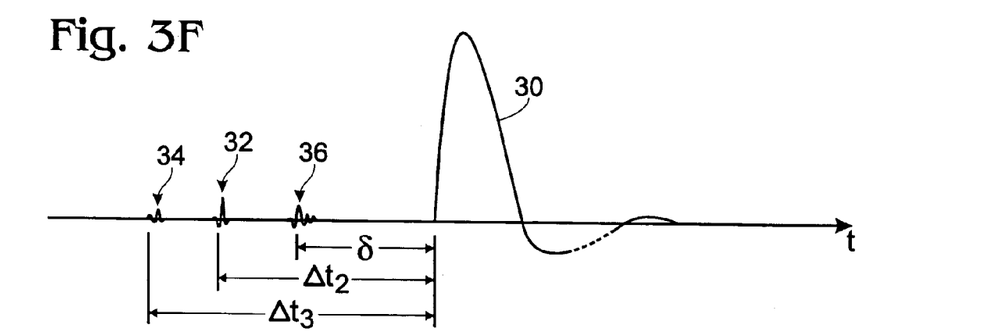
FIG. 3F shows the waveform of FIG. 3E wherein a section thereof containing an artifact produced by the crosstalk from the third channel has been removed.
Figure 3G:
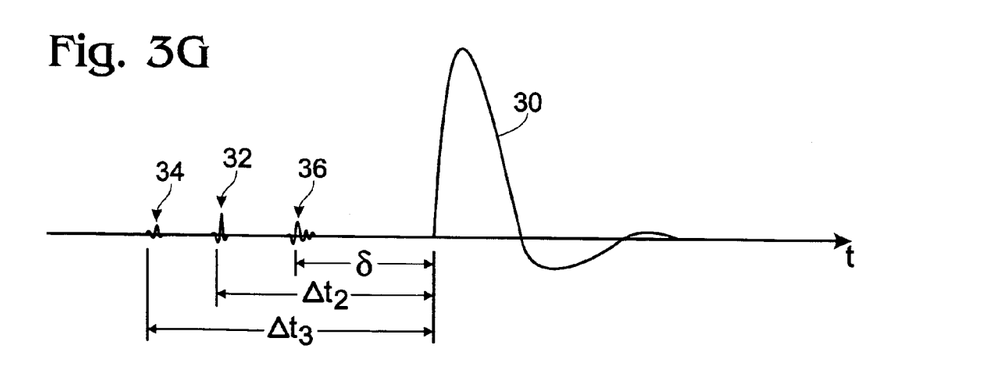
FIG. 3G shows the waveform of FIG. 3F wherein the section of the waveform that was removed has been replaced by a section produced by interpolation without the crosstalk artifact.

In one embodiment of the invention where separation occurs in the time domain, a section of the channel impulse response including the crosstalk artifact is deleted from the response, as shown in FIG. 3F. A third-order polynomial is used to fit to the underlying data on either side of the crosstalk response, outside of the crosstalk extent established by $f_c$. The estimate is inserted in the place of the crosstalk response, so the crosstalk response does not corrupt the underlying response. The polynomial fit is then used as an estimate of the underlying response in the region in which the crosstalk existed as shown in FIG. 3G. This process is shown in greater detail in FIGS. 4A through 4D.

Figure 4A:
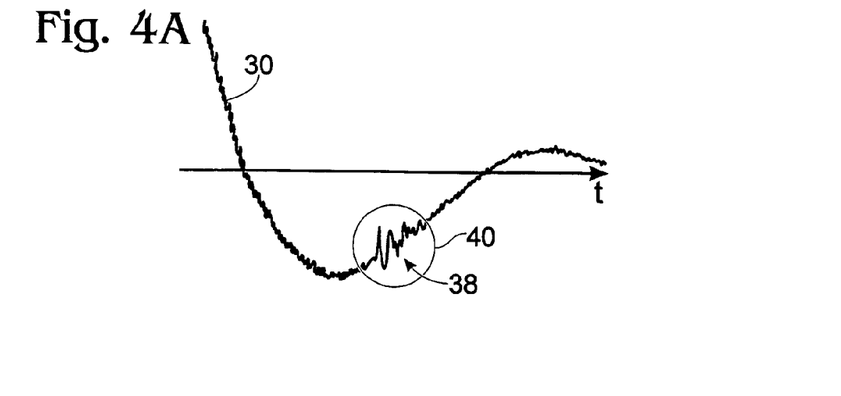
FIG. 4A is a magnified view of a portion of the waveform of FIG. 3E showing the crosstalk artifact from the third channel and noise superimposed on the tail of the linear impulse response of the first channel.
Figure 4B:
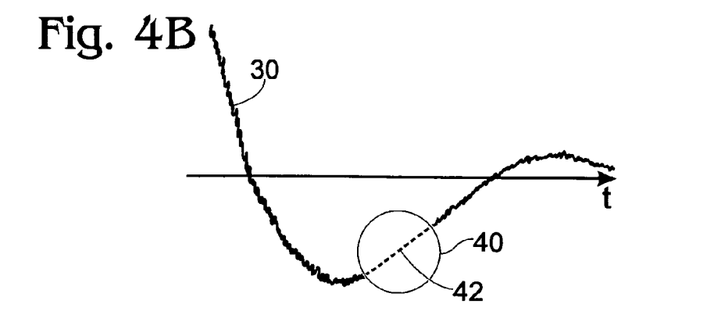
FIG. 4B shows the waveform of FIG. 4A with the section removed as in FIG. 3F.
Figure 4C:
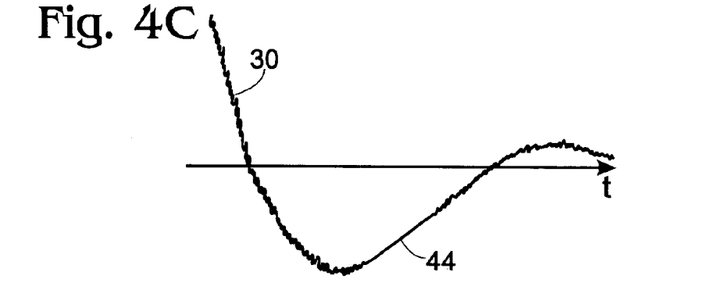
FIG. 4C shows the waveform of FIG. 4B wherein the section of the waveform that was removed has been replaced by a section produced by interpolation without the crosstalk artifact.

In FIG. 4A a portion of the waveform of FIG. 3E is magnified to show in greater detail the section enclosed by circle 40. This magnified portion shows by random amplitude variations that there is actually noise on the waveform 30. FIG. 4B shows the same portion of waveform 30, but with the encircled section deleted, as shown by a dashed line 42. FIG. 4C shows a new section 44 that has been produced using the aforementioned polynomial fit. Deleted section 40 is shown in FIG. 4E. To separate the linear impulse response from this section, the section 40 is subtracted therefrom, which produces the crosstalk waveform 48 shown in FIG. 4F. This is then used to compute the amount of crosstalk from channel 3. It will be understood by a person of ordinary skill in the art that all of these steps can be readily carried out using standard digital signal processing techniques.

In another embodiment of the invention where separation occurs in the time domain, lowpass and highpass filters are used to separate the parts of the signal below $f_c$ (underlying measured channel impulse response) and above $f_c$ (crosstalk response) in the section of waveform 30 inside circle 40. In practice this process is preferably carried out using digital FIR or IIR filters. The part below $f_c$ is re-inserted into the deconvolved response. The part above $f_c$ is the recovered crosstalk response.

In a frequency domain embodiment a time-to-frequency transform is performed on the section of waveform 30 inside circle 40 in FIG. 3E, preferably using a Fast Fourier Transform, and then two operations are performed on the result. In one operation, the part of the frequency domain representation of that section below $f_c$ is set to zero and an inverse transform, that is a frequency-to-time transform, is performed to recover the crosstalk response. In the other operation, the part of the representation above $f_c$ is set to zero and an inverse transform is performed to recover the underlying measurement channel response, which is then used to replace the section inside circle 40.

In both the time-domain and frequency domain embodiments, the inserted response is 'smooth' relative to the neighboring response, because of noise in the measured data that does not exist in the polynomial fit or filtered section. This sudden change in the data would cause artifacts in the recovered underlying response; that is, combing artifacts from the sudden switch off and on of noise on either side of the inserted segment will produce unwanted artifacts. This is avoided by estimating the noise level of the surrounding data, generating wideband noise of the same RMS level, and adding that noise to the inserted segment.

Figure 4D:
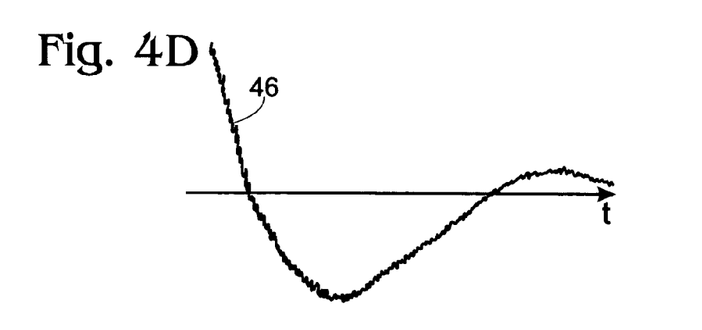
FIG. 4D shows the waveform of FIG. 4D wherein noise has been added back to the section produced by interpolation.
Figure 4E:
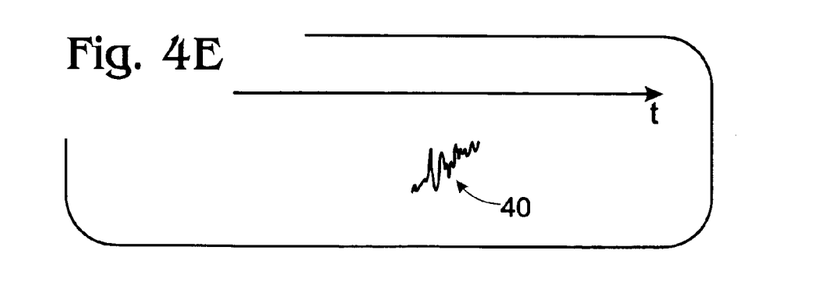
FIG. 4E shows the waveform of the section removed from FIG. 4A.
Figure 4F:
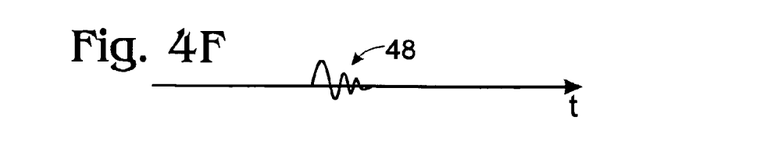
FIG. 4F shows the waveform of the crosstalk with the underlying channel response removed.

Noise is added to this section based on the noise spectrum of the waveform 30, as shown by the corrected linear impulse response waveform 46 in FIG. 4D. In the time-domain embodiment, the noise level is estimated using the same data that was used to generate the polynomial fit, that is, the data outside of the crosstalk boundaries. To accomplish this, the polynomial fit is subtracted from this data to leave a residual noise floor. Then, the RMS value of this floor is then measured and that amount of noise is added to the polynomial fit.

However, other techniques could be used without departing from the principles of the invention. For example, in the second time-domain embodiment, the high pass filter used to separate the crosstalk from the underlying response can be applied to the region outside the crosstalk response, and the RMS level of the resulting filtered signal can then be used to model the noise.

As another example, in the frequency-domain embodiment the transform used to separate crosstalk may be applied to the region outside the crosstalk boundaries, and the RMS level of the signal above $f_c$ will provide an estimate of the noise level.

The Measurement Apparatus

A preferred embodiment of a measurement apparatus according to the present invention comprises a test signal source that provides a plurality of test signals for application to respective inputs of a plurality of audio system channels, a signal acquisition device for acquiring from the outputs of a plurality of channels respective output signals responsive to the corresponding test signals, and a signal processing device for analyzing the output signals to determine channel transfer characteristics and crosstalk. Preferably, the test signals are generated by a digital signal generator and the signal processing device comprises a digital signal processor. Preferably, the digital signal processor is a programmed digital computer, though special purpose digital signal processing circuits could also be used.

Turning again to FIG. 1A, where the audio system under test 10 has analog inputs and analog outputs, an exemplary embodiment of the measurement apparatus comprises a digital computer 100, having an input device such as keyboard 102, an output device such as video display 104, a signal output port 106, and a signal input port 108. The computer is programmed to generate a plurality of test signals and produce them at the output port 106. The test signals are transmitted over a bus 110 to a respective plurality of digital-to-analog converters 112$_{1-N}$, which convert the test signals to analog form for application to respective inputs 114$_{1-N}$ of channels 116$_{1-N}$ of the system under test 10. Output signals from those channels responsive to the test signals are produced at outputs 118$_{1-N}$. Those output signals are applied to respective analog inputs of analog-to-digital converters 120$_{1-N}$, whose respective digital outputs 122$_{1-N}$ are applied to bus 124 and transmitted thereby to the input port 108 of the computer 100.

Figure 1B:
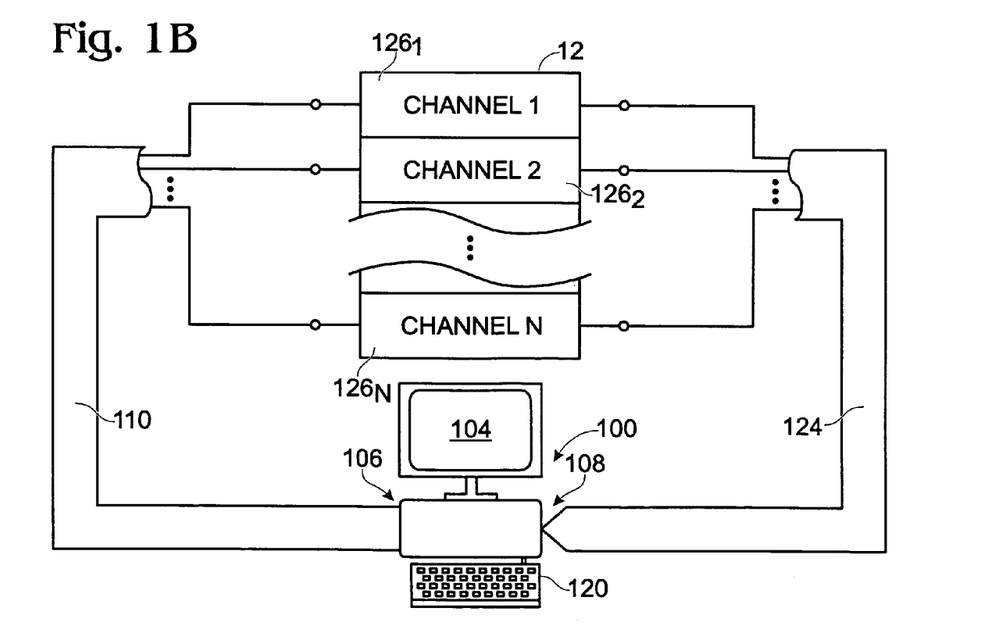
FIG. 1B is a block diagram of a measuring apparatus according to the present invention connected to a representative multi-channel system under test having digital inputs and digital outputs.
Figure 1C:
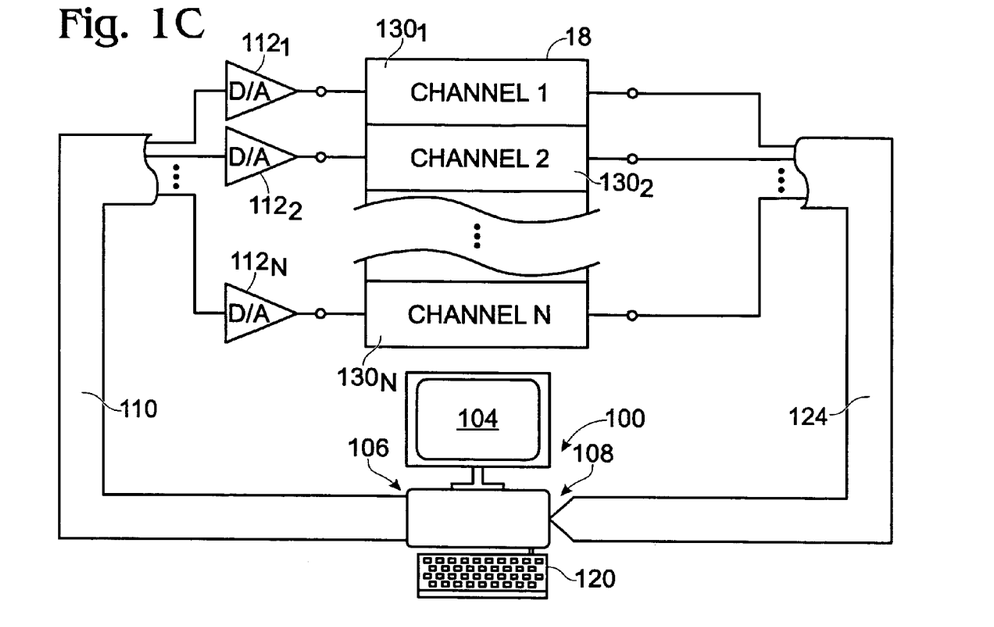
FIG. 1C is a block diagram of a measuring apparatus according to the present invention connected to a representative multi-channel system under test having analog inputs and digital outputs.
Figure 1D:
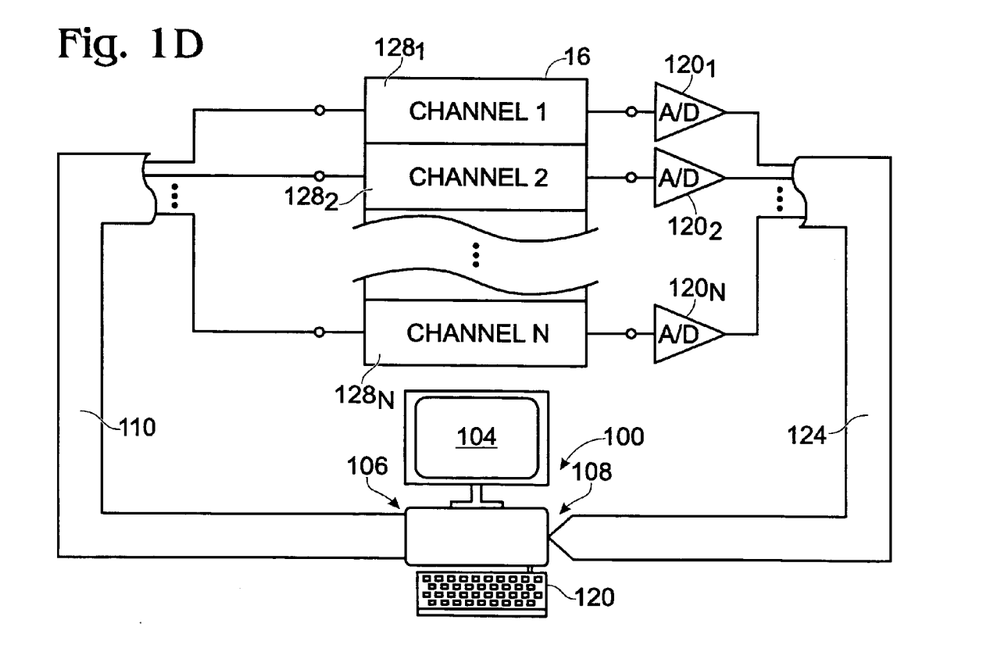
FIG. 1D is a block diagram of a measuring apparatus according to the present invention connected to a representative multi-channel system under test having digital inputs and analog outputs.

Alternatively, the measurement apparatus may be configured as shown in FIG. 1B for use with the audio system 12, which has channels 126$_{1-N}$ with digital inputs and digital outputs. Only in this case, no digital-to-analog converters or analog-to-digital converters are used because the computer generates digital test signals and receives digital input signals. Similarly, the measurement apparatus may be configured as shown in FIG. 1C for use with audio system 16, which has channels 128$_{1-N}$ with digital inputs and analog outputs. In this case, only analog-to-digital converters 120$_{1-N}$ are used. Conversely, the measurement apparatus may be configured as shown in FIG. 1D for use with audio system 18, which has channels 130$_{1-N}$ with digital inputs and analog outputs. In this case, only digital-to-analog converters 114$_{1-N}$ are used. Regardless of which of these types of audio systems is to be tested and which measurement apparatus configuration is used, the test signal generation and system output signal processing is preferably done the same way.

The computer 100 is preferably programmed to produce test signals in accordance with the steps described hereafter.

First, chirp parameters selected by the user are identified. These parameters may include chirp duration, sample rate, frequency extent, and the number of channels. Some internal constants define the time domain extents of the responses of interest. That is, they determine the maximum separation between crosstalk responses in the deconvolved response such that (N−1) responses (where N is the number of channels) fit between the start of the linear impulse response and the end of the second harmonic response. This gives the inter-channel delay, δ.

Second, a signal is generated in each channel so that channel n+1 is δ seconds behind channel n. Assuming that the device produces crosstalk, then the chirp signal applied to channel n+1 will show up as crosstalk in channel n, and the chirp signal applied to channel n will show up as crosstalk in channel n+1.

Third, the outputs of the channels are deconvolved, as is commonly understood in the art. As discussed above, the result of deconvolution of the output of channel n contains not only the linear impulse response of that channel and harmonic distortion components, but also a crosstalk component from channel n+1 at position δ seconds behind the start of the linear impulse response. Similarly, the result of the output of channel n+1 contains a crosstalk component from channel n at position δ seconds ahead of the start of the linear impulse response of channel n+1.

Figure 5:
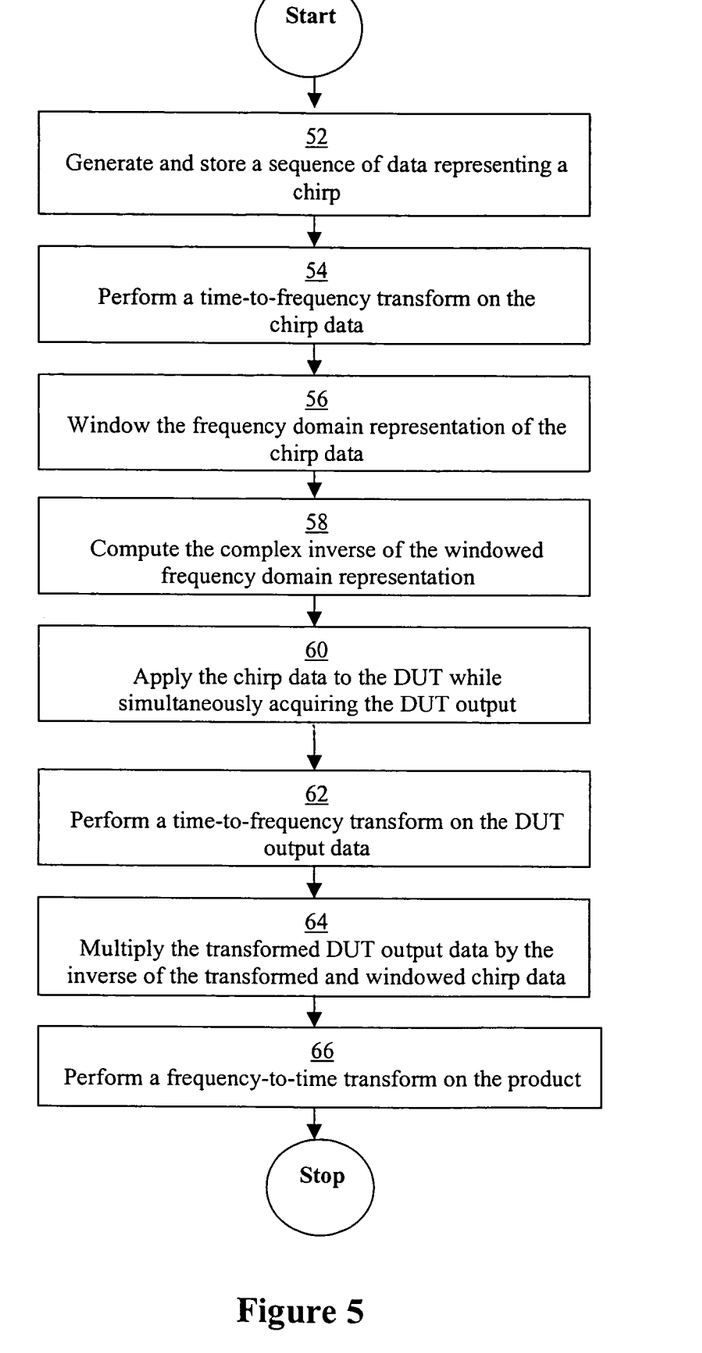
FIG. 5 is an illustrative flowchart of steps to perform deconvolution of a single channel.

For example, as shown in the flow chart of FIG. 5, at 50 a chirp is generated by by the processor 100 and stored as a sequence of data in the memory of the processor. At 52 the generated chirp data is transformed from the time domain to the frequency domain. At 54, the transformed, frequency domain representation of the chirp is windowed by an appropriate windowing function, to prevent the inverse from producing magnitude extremes for frequencies outside the frequencies of interest. At 56, the complex inverse of the transformed and windowed chirp is computed. The chirp data is applied to the DUT 12 and the output of the DUT is simultaneously acquired by processor 100, shown at 58. A frequency-to-time domain transformation is performed on the output signal at 60, and the transformed data is multiplied by the complex inverse of the transformed and windowed chirp data, as shown at 62. Finally, a frequency-to-time transform is performed on the product at 64 to reveal a time-domain impulse response.

Fourth, the crosstalk components are located by the known time delay δ between chirp signals applied to each channel.

Fifth, the crosstalk components are separated from the channel impulse response. In the case of channel n+1, the crosstalk resides in a quiet region between the impulse response and the second harmonic distortion. Separation is therefore relatively easy. However, in the case of channel n, the crosstalk resides on top of the tail of the linear impulse response, as explained above.

Sixth, a selected measurement of crosstalk is made. For example, if it is desired to examine the crosstalk response from channel n+1 into channel n, the channel n+1 crosstalk response is extracted from the channel n deconvolved response by one of the methods described above. The crosstalk response is then windowed and transformed to reveal a crosstalk power spectrum. The crosstalk recovery and replacement process is repeated for each region in each channel where crosstalk can exist. For a given channel, there are N−1 crosstalk responses.

If, for another example, what is desired is a sum of crosstalk responses of all channels into a given channel (as might be done when testing a multi-track recorder under worst-case conditions), then each crosstalk response present in channel n's deconvolved response is first extracted. Then, each is forward transformed with the same length transform to give N−1 power spectra. The power spectra are then added together in RMS fashion to give a total crosstalk spectrum.

Seventh, other measurements of channel transfer characteristics, such as linear impulse response, frequency response, individual harmonic distortion, total harmonic distortion and group delay, are made from the impulse response from which crosstalk has been separated. It is to be understood that the various metrics may be computed in any convenient order without departing from the principles of the invention.

The terms and expressions that have been employed in the foregoing specification are used therein as terms of description and not of limitation, and there is no intention, in the uses of such terms and expressions, to exclude equivalents of the features shown and described or portions thereof, it being recognized that the scope of the invention is defined and limited only by the claims which follow.

What is claimed is:

1. A method for measuring channel characteristics of a multi-channel system, comprising:

applying a first chirp as an input to a first channel of the multi-channel system at a first time;

applying a second chirp as an input to a second channel of the multi-channel system at a second time, the second time being separated from the first time by a predetermined time interval;

acquiring an output signal from a selected one of the first channel or the second channel;

separating at least one crosstalk component from non-crosstalk components in the first output signal to characterize the selected one channel based on non-crosstalk components.

2. The method of claim 1, wherein the separating includes identifying the linear impulse response of the selected one channel and locating a crosstalk component relative to the occurrence of the linear impulse response based on the predetermined time interval.

3. The method of claim 2, wherein the location of the linear impulse response is identified by its magnitude.

4. The method of claim 3, wherein the second chirp occurs before the first chirp.

5. The method of claim 2, wherein the second chirp occurs before the first chirp.

6. The method of claim 2, wherein the second chirp occurs after the first chirp.

7. The method of claim 6, wherein separating a crosstalk component further comprises removing from the output signal a first set of data representative of the crosstalk component produced by the second chirp and replacing it with a second set of data obtained by interpolating data representative of the output signal remaining after the first set of data has been removed.

8. The method of claim 7, wherein the linear impulse response is located by its magnitude.

9. The method of claim 7, wherein the interpolating is carried out using a polynomial curve fit.

10. The method of claim 9, wherein the linear impulse response is located by its magnitude.

11. The method of claim 7, wherein noise is added to the second set of data to match the noise in the first set of data.

12. The method of claim 8, further comprising calculating linear response characteristics of the selected one channel based on the linear impulse response thereof.

13. The method of claim 12, further comprising using an exponential chirp and separating harmonic distortion components from both the linear impulse response and crosstalk components.

14. The method of claim 1, wherein separating a crosstalk component comprises filtering a section of the output signal corresponding to that crosstalk component to produce a crosstalk portion above a cutoff frequency and a non-crosstalk portion below the cutoff frequency, the cutoff frequency being the lowest expected frequency of the crosstalk component.

15. The method of claim 14, wherein the second chirp occurs after the first chirp and separating the crosstalk component further comprises removing from the output signal a first set of data representative of the crosstalk component and replacing it with a second set of data obtained by interpolating data representative of the first output signal remaining after the first set of data has been removed.

16. The method of claim 15, wherein the interpolating is carried out using a polynomial curve fit.

17. The method of claim 16, wherein noise is added to the second set of data to match the noise in the first set of data.

18. The method of claim 17, further comprising calculating linear response characteristics of the selected one channel based on the linear impulse response thereof.

19. The method of claim 18, further comprising using an exponential chirp and separating harmonic distortion components from both the linear impulse response and crosstalk components.

20. The method of claim 1, wherein a time-to-frequency transform is applied to the a section of the output signal corresponding to a crosstalk component to produce a frequency-domain representation thereof, the part of the frequency-domain representation below a cutoff frequency is set to zero to produce a first portion thereof, a frequency-to-time domain transformation is performed on the first portion thereof to produce a time-domain representation of non-crosstalk components, the part of the frequency-domain representation above the cutoff frequency is set to zero to produce a second portion thereof, and a frequency-to-time domain transformation is performed on the second portion thereof to produce a time-domain representation of the crosstalk component.

21. The method of claim 20, wherein the second chirp occurs after the first chirp and separating a crosstalk component further comprises removing from the output signal a first set of data representative of a crosstalk component and replacing it with a second set of data obtained by interpolating data representative of the first output signal remaining after the first set of data has been removed.

22. The method of claim 21, wherein the interpolating is carried out using a polynomial curve fit.

23. The method of claim 22, wherein noise is added to the second set of data to match the noise in the first set of data.

24. The method of claim 23, further comprising calculating linear response characteristics of the selected one channel based on the linear impulse response thereof.

25. The method of claim 24, further comprising using an exponential chirp and separating harmonic distortion components from both the linear impulse response and crosstalk components.

26. The method of claim 1, further comprising using an exponential chirp and separating harmonic distortion components from both the linear impulse response and crosstalk components.

27. An apparatus for measuring channel characteristics of a multi-channel system, comprising:
    a signal generator for generating a first chirp as an input to a first channel of the multi-channel system at a first time and for generating a second chirp as an input to a second channel of the multi-channel system at a second time, the second time being separated from the first time by a predetermined time interval;
    a signal acquisition device for acquiring an output signal from a selected one of the first channel or the second channel;
    a signal processing device for separating at least one crosstalk component from non-crosstalk components in the first output signal to characterize the selected one channel based on non-crosstalk components.

28. The apparatus of claim 27, wherein the signal generator comprises a digital processor programmed to produce digital representations of the first chirp signal and the second chirp signal, and digital-to-analog converters for converting the digital representations of the first chirp signal and the second chirp signal to analog representations thereof.

29. The apparatus of claim 28, wherein the signal acquisition device comprises analog to digital converters for converting analog signal outputs from the multi-channel system under test to digital representations thereof.

30. The apparatus of claim 29, wherein the signal processing device comprises a digital signal processor programmed to separate in the first output signal at least one crosstalk component from the non-crosstalk components.

31. The apparatus of claim 27, wherein the signal processing device comprises a signal processing device programmed to distinguish in the first output signal at least one crosstalk component from the non-crosstalk components.

32. The apparatus of claim 31, wherein the signal processing device is programmed to locate the linear impulse response of the selected one channel and locate a crosstalk component relative to the occurrence of the linear impulse response based on the predetermined time interval.

33. The apparatus of claim 32, wherein the linear impulse response is located by its magnitude.

34. The apparatus of claim 33, wherein the second chirp is generated before the first chirp.

35. The apparatus of claim 32, wherein the second chirp is generated before the first chirp.

36. The apparatus of claim 32, wherein the second chirp is generated after the first chirp.

37. The apparatus of claim 36, wherein the signal processing device is programmed to separate a crosstalk component by removing from the output signal a first set of data representative of the crosstalk component and replacing it with a second set of data obtained by interpolating from data representative of the first output signal remaining after the first set of data has been removed.

38. The apparatus of claim 37, wherein the signal processing device is programmed to locate the linear impulse response by its magnitude.

39. The apparatus of claim 38, wherein the interpolating is carried out using a polynomial curve fit.

40. The apparatus of claim 39, wherein the signal processing device is programmed to locate the linear impulse response by its magnitude.

41. The apparatus of claim 37, wherein the signal processing device is programmed to add noise to the second set of data to match the noise in the first set of data.

42. The apparatus of claim 38, wherein the signal processing device is programmed to calculate linear response characteristics of the selected one channel based on the linear impulse response thereof.

43. The apparatus of claim 42, wherein the signal generator produces an exponential chirp and the signal processing device is programmed to separate harmonic distortion components from both the linear impulse response and crosstalk components.

44. The apparatus of claim 36, wherein the signal processing device is programmed to separate crosstalk components by filtering a section of the output signal corresponding to the crosstalk component to produce a crosstalk portion above a cutoff frequency and a non-crosstalk portion below the cutoff frequency, the cutoff frequency being the lowest expected frequency of the crosstalk component.

45. The apparatus of claim 44, wherein the second chirp is generated after the first chirp and the signal processing device is programmed to separate a crosstalk component by removing from the output signal a first set of data representative of the crosstalk component and replacing it with a second set of data obtained by interpolating from data representative of the first output signal remaining after the first set of data has been removed.

46. The apparatus of claim 45, wherein the interpolating is carried out using a polynomial curve fit.

47. The apparatus of claim 46, wherein is the signal processing device is programmed to add noise to the second set of data to match the noise in the first set of data.

48. The apparatus of claim 47, wherein the signal processing device is programmed to calculate linear response characteristics of the selected one channel based on the linear impulse response thereof.

49. The apparatus of claim 48, wherein the signal generator produces an exponential chirp and the signal processing device is programmed to separate harmonic distortion components from both the linear impulse response and crosstalk components.

50. The apparatus of claim 27, wherein the signal processing device is programmed to perform a time-to-frequency transform on a section of the output signal corresponding to a crosstalk component to produce a frequency-domain representation thereof, the part of the frequency-domain representation below a cutoff frequency is set to zero to produce a first portion thereof, a frequency-to-time domain transformation is performed on the first portion thereof to produce a time-domain representation of non-crosstalk components, the part of the frequency-domain representation above the cutoff frequency is set to zero to produce a second portion thereof, and a frequency-to-time domain transformation is performed on the second portion thereof to produce a time-domain representation of the crosstalk component.

51. The apparatus of claim 50, wherein the second chirp is generated after the first chirp and the signal processing device is programmed to separate a crosstalk component by removing from the output signal a first set of data representative of the crosstalk component and replacing it with a second set of data obtained by interpolating from data representative of the first output signal remaining after the first set of data has been removed.

52. The apparatus of claim 51, wherein the interpolating is carried out using a polynomial curve fit.

53. The apparatus of claim 22, wherein the signal processing device is programmed to add noise to the second set of data to match the noise in the first set of data.

54. The apparatus of claim 23, wherein the signal processing device is programmed to calculate linear response characteristics of the selected one channel based on the linear impulse response thereof.

55. The apparatus of claim 54, wherein the signal generator produces an exponential chirp and the signal processing device is programmed to separate harmonic distortion components from both the linear impulse response and crosstalk components.

56. The apparatus of claim 27, wherein the signal generator produces an exponential chirp and the signal processing device is programmed to separate harmonic distortion components from both the linear impulse response and crosstalk components.

* * * * *